United States Patent [19]

Wild

[11] Patent Number: 5,164,214
[45] Date of Patent: Nov. 17, 1992

[54] SWEETENING AGENT

[75] Inventor: Rainer Wild, Heidelberg, Fed. Rep. of Germany

[73] Assignee: Rudolf-Wild GmbH & Co. KG, Fed. Rep. of Germany

[21] Appl. No.: 707,302

[22] Filed: May 29, 1991

Related U.S. Application Data

[63] Continuation of Ser. No. 562,730, Aug. 3, 1990, abandoned, which is a continuation of Ser. No. 279,069, Dec. 2, 1988, abandoned.

[30] Foreign Application Priority Data

Dec. 10, 1987 [DE] Fed. Rep. of Germany ....... 3741961
Nov. 25, 1988 [DE] Fed. Rep. of Germany ....... 3839869

[51] Int. Cl.$^5$ ............................................. A23L 1/236
[52] U.S. Cl. .................................. 426/548; 426/599; 426/658
[58] Field of Search .................. 426/548, 599, 658

[56] References Cited

U.S. PATENT DOCUMENTS

| | | | |
|---|---|---|---|
| 2,761,783 | 9/1956 | Ferguson | 426/548 |
| 3,296,079 | 1/1967 | Griffin | 426/548 X |
| 3,704,138 | 11/1972 | La Via et al. | 426/548 |
| 3,761,288 | 9/1973 | Glicksman et al. | 426/548 |
| 3,780,189 | 12/1973 | Scott | 426/548 X |
| 3,956,507 | 5/1976 | Shoaf et al. | 426/548 X |
| 4,084,010 | 4/1978 | Takemoto et al. | 426/548 |
| 4,101,338 | 7/1978 | Rapaport et al. | 127/54 X |
| 4,288,464 | 9/1981 | Smith | 426/548 |
| 4,412,984 | 11/1983 | van der Loo et al. | 426/548 X |
| 4,690,827 | 9/1987 | Kupper et al. | 426/548 |

FOREIGN PATENT DOCUMENTS 0071868 4/1983 Japan .................. 426/548

Primary Examiner—Joseph Golian
Attorney, Agent, or Firm—Finnegan, Henderson, Farabow, Garrett & Dunner

[57] ABSTRACT

A sweetening agent having an improved sucrose-like flavor, which comprises a) from 0.3 to 10% by weight of at least one synthetic sweetener selected from the group consisting of aspartame, acesulfame K, sodium cyclamate and saccharin, and b) from 40.0 to 98.0% by weight of at least one dearomatized and concentrated fruit preparation with a dry solids content of 60° to 80° Brix and a dry product made therefrom.

16 Claims, No Drawings

SWEETENING AGENT

This application is a continuation, of application Ser. No. 07/562,730, filed Aug. 3, 1990 now abandoned which is a continuation of Ser. No. 07/279,069, filed Dec. 2, 1988 now abandoned.

BACKGROUND OF THE INVENTION

This invention relates to a sweetening agent having an improved sucrose-like flavor, a dry product made therefrom, a method of producing it and the use thereof.

For dietary or medical purposes, synthetic sweeteners of low nutritional value are increasingly being used instead of sugar to reduce the intake of calories. Apart from saccharin and cyclamate, which have been known for a long time, aspartame (L-aspartyl-Lphenylaline methyl ester) and acesulfame K (potassium salt of 6-methyl-1,2,3-oxathiazine-4(3H)-one-2,2-dioxide) are the only other synthetic sweeteners of importance. In contrast to sugar substitutes such as fructose, xylite, sorbitol and mannitol, they have no energy source and therefore have been used increasingly in low-calorie food.

An important criterion of these sweeteners is their sweetening power which in comparison with sucrose is substantially greater. Saccharins and cyclamates, however, have the disadvantage that they leave a bitter aftertaste in the mouth. Although aspartame tastes very good, it has limited stability. Acesulfame K is not quite as sweet as aspartame, but has a longer shelf life.

As described in German Patent 25 60 544, attempts have been made to eliminate these disadvantageous properties by mixing sweeteners with each other. Mixtures of sweeteners are especially used because the sweet flavor is often synergistically increased thereby so that in comparison with pure sweeteners a certain amount of sweetener can be saved.

Another reason for using mixtures of sweeteners is that some of the known sweeteners develop their sweetness on the tongue very late whilst others develop a sweet taste very early, with the latter, however, also disappearing very soon. This disadvantage can be largely offset by admixing sweeteners of shorter and longer lasting sweetness or also through mixing with natural sugars, if desired.

A method of improving the flavor of acesulfame K in household preparations is known from German patent application 33 31 517 wherein prior to use, acesulfame K is evenly mixed with other substances and used in the form of this mixture. Amino acids or mixtures of amino acids, preferably glycine and glutamic acid or monosodium glutamate, are used for mixing.

Furthermore, German Patent 25 60 544 and German patent application 25 56 109 disclose sweetened foodstuffs and modified sweeteners respectively which contain aspartame, optionally mixed with saccharin, a cyclamate or sucrose, as well as aluminum potassium sulfate and/or naringine naringenine-5-rhamnosido glucoside as flavor modifiers in amounts effective to modify the lasting sweet aftertaste of the above-mentioned sweetener.

German patent application 34 222 247 discloses a method of preparing a carrier for sweeteners wherein a special monosaccharide or disaccharide is reacted with an aqueous sucrose solution to form a gluco-oligosaccharide mixture.

Japanese Patent 59-154-956 discloses a sweetening agent consisting of acesulfame K and fructose.

Hence, all sweetener mixtures that have so far been known relate to mixtures of synthetic sweeteners of defined chemical compounds.

German patent application 12 55 467 discloses a method of producing a colorless sweetening agent by comminuting pomaceous fruit, heating the mash, separating, cleaning and concentrating the juice.

German patent application 24 56 926 relates to a sweetener preparation which contains aspartame as the synthetic sweetener enclosed in a matrix forming material. So-called "fusion agents", which may also be juice crystals, are used as the matrix forming material. However, a sweetening agent having an improved sucrose-like flavor is not obtained.

It is desirable that especially the sucrose likeness of the flavor of sweetener mixtures be further improved because the sweet flavor of sucrose has become the standard against which the sweetness of all sweeteners is judged.

SUMMARY OF THE INVENTION

It is therefore an object of this invention to provide a sweetening agent and a dry product made therefrom having an improved sucrose-like flavor and a method of producing the same.

This object is attained by a sweetening agent of the abovementioned kind which contains:

a) at least one synthetic sweetener, and
b) at least one dearomatized and concentrated fruit preparation with a dry solids content of 60° to 80° Brix.

The dry product of the invention contains such a sweetening agent and at least one carrier material.

DETAILED DESCRIPTION OF THE INVENTION

Component a) of the sweetening agent of the invention is preferably aspartame, acesulfame K, sodium cyclamate or saccharin. One or more of these sweeteners may be used for mixing with component b). Preferred, however, is the use of a mixture consisting of two sweeteners, with a mixture of aspartame and acesulfame K being especially preferred.

One or more dearomatized and concentrated fruit preparations is used as component b). The fruit preparations can be made from both light-colored and dark-colored fruits. Fruit preparations made from light-colored fruits, especially apple, pear, grape, lemon, apricot, pineapple and orange, are preferably used. Mixtures of two fruit preparations, e.g. mixtures of pear and pineapple or grape and orange, are especially suited. These fruit preparations must have dry solids contents of 60° to 80° Brix.

The fruit preparations are obtained by clarifying juice concentrates, e.g. through filtration, by dearomatizing them through vacuum evaporation and by concentrating same, if desired, through ultra-filtration or reverse osmosis. A corresponding treatment of the resultant concentrates on ion exchangers adjusts the acid content thereof to the desired value. If necessary, the concentrates are additionally adjusted to the desired dry solids content. The total amount of acid, determined as titer (according to ml 1N-KOH per 10 g fruit preparation) is preferably in the range of 0.01 to 6 ml 1N-KOH per 10 g fruit preparation.

The amount of components a) and b) in the sweetening agent of the invention depends on the intended purpose of the mixture. 0.3 to 10.0% by wt. of component a) is preferably used and especially preferred is 1.0 to 6.0% by wt. When a mixture of two sweeteners is used, the amount of the individual sweeteners can be in the range of 0.15 to 5.0% by wt. The amount of component b) is preferably from 40.0 to 98.0% by wt., based on the total weight of the sweetening agent.

The addition of maltol to the sweetening agent is preferred because it further intensifies the sucrose-like flavor of the sweetening agent of the invention. Maltol is preferably used in an amount of 0.005 to 1.0% by wt., based on the agent, with an amount of 0.025 to 1.0% by wt. being especially preferred.

While the present sweetening compositions may conveniently include maltol, such is not necessary to mask the bitter aftertaste characteristic of artificial sweeteners. In the claimed sweetening agent, maltol is used for intensifying the sucrose-like flavor obtained by the mixture of the synthetic sweetener and the fruit preparation.

When the sweetening agent of the invention is used for sweetening liquid food, especially beverages, it may also contain water and other additions such as ascorbic acid. The amount of ascorbic acid is preferably in the range of 0.1 to 0.2% by wt.

Surprisingly enough, it has been found that the sweetening agent of the invention has a considerably improved sucrose-like flavor in comparison with known mixtures of sweeteners. Because it synergistically intensifies the sweet flavor in the mixture consisting of the synthetic sweeteners and the natural fruit preparation, the amount of synthetic sweeteners can be considerably reduced. This synergistically intensified sweet flavor is provided because the fruit preparation enhances the sweetness of the synthetic sweeteners better than known mixtures of sweeteners. It is for instance necessary to add only 0.5 to 1.8% by wt. of the sweetening agent of the invention to foodstuffs to attain a satisfactory sucrose-like sweetness.

The fruit preparation of the sweetening agent of the invention is more particularly described as a composition comprising all components of natural fruits except for the aromatic components. Since light-colored and dark-colored fruits may be used in the described preparation with equally enhanced sucrose-like sweetening effect, the characteristic sucrose-like sweetening ability of the fruit preparation does not rely on the color of the particular fruit used. Instead, the importance of the fruit preparation as a sweetening enhancing agent lies in the mixture of the various components which make up the fruit, except for the aromatic components. These fruit preparations, therefore, contain a mixture of the various sugars, acids and colors characteristic of the particular fruit selected. The specific colors and other components of the preparation will depend on the particular fruit or fruits selected.

The sweetening agent of the invention and the dry product made therefrom are especially suited for sweetening liquid food such as beverages, or dairy products such as milk products with a fat content of 0.3 to 10%, e.g. fruit yogurt or fruit buttermilk, or ice-cream products. The sweetening agent of the invention may also be expeditiously used in the sweetening of fruit and cream fillings. Such fruit and cream fillings may be used, for example, together with various bakery foodstuffs.

The sweetening agent of the invention can be used in liquid and solid form. The dry product can be obtained from a liquid mixture by common techniques, such as spray drying and/or freeze drying, using suitable carrier materials such as maltodextrine or lactose. The dry product of the invention preferably contains 20 to 40% by wt. of the sweetening agent of the invention, 30% by wt. being especially preferred, and 60 to 80% by wt. of the carrier material, 70% by wt. being especially preferred.

The dry product of the invention can then be used in powder form, in granular form, (e.g. as a sweetener of low bulk density for sprinkling purposes), or in tablet form after pressing.

When tablets are made, the dry product of the invention which contains a mixture of the sweetening agent and the carrier material may have at least one further synthetic sweetener, e.g. a mixture of aspartame and acesulfame K added thereto, as well as various adjuvants such as pressing adjuvants, (such as corn starch, sorbitol or vegetable fats, or suitable expanding agents (such as tartaric acid or sodium bicarbonate), for accelerating the dissolution. Such a tablet preferably contains 10 to 40% by wt. of the mixture consisting of sweetening agent and carrier material, 20 to 30% by wt. being especially preferred, and 10 to 40% by wt. of an additional synthetic sweetener, 20 to 30% by wt. being especially preferred. The dry product therefore differs from the basic sweetening agent in that in addition to the components which make up the defined sweetening agent, a pure synthetic sweetener is added to the mixture. Thus, in a particularly preferred embodiment of the invention, a dry product is provided which comprises a sweetening agent including 0.3 to 10% by weight based on the weight of the agent of at least one synthetic sweetener and from 40.0 to 98.0% by weight based on the weight of the agent of at least one dearomatized and concentrated fruit preparation having a dry solids contents of 60 to 80 Brix; at least one carrier material; at least one pressing adjuvant; an expanding agent; and 10 to 40% by weight based on the weight of the dry product of an additional synthetic sweetener.

To make granules, e.g., sweeteners for sprinkling purposes, at least one further sweetener can also be added to the dry product of the invention. The obtained product preferably contains 10 to 30% by wt. of the mixture consisting of sweetening agent and carrier material, 15 to 25% by wt. being especially preferred, and 0.1 to 5.0% by wt. of the added synthetic sweetener, 0.4 to 4% by wt. being especially preferred.

The sweetening agent of the invention and the dry product of the invention are suitable for use as products for the food industry and can be directly used for domestic purposes.

To give the sweetening agent of the invention good solubility, stability and microbiological stability, the titer of the agent should preferably be in the range of 0.01 to 6 ml 1N-KOH/10 g mixture, and the pH in the range of 2.8 to 4.5.

To produce the sweetening agent, powdery synthetic sweetener, which may be optionally mixed with maltol and/or ascorbic acid, is dispersed and dissolved in the fruit preparation used according to the invention. The liquid dispersion is subsequently pasteurized with the sweeteners being entirely dissolved and the corresponding microbiological stability being attained, and the product is then dried, if desired.

A carrier material is added to the above solution to make the dry product. The resultant product can then be granulated in the customary way, optionally after drying. Alternatively, the resultant product can be pressed after drying to form tablets.

The following examples will explain particularly preferred embodiments of the invention.

EXAMPLE 1

0.8 g aspartame and 0.8 g acesulfame K are mixed in powder form with 0.1% by wt. of ascorbic acid and 100 ml drinking water are added thereto. 95 g of a fruit preparation consisting of pear and pineapple juice (mixing ratio 1:1) are added thereto, the fruit preparation having been obtained by filtration, dearomatization and concentration to a dry solids content of 65° Brix.

The mixture is dispersed and pasteurized. The product obtained has a pH of 4. and a titer of 4 ml 1N-KOH/10 g sweetening agent.

EXAMPLE 2

1 g aspartame and 1.5 g acesulfame K are dispersed in 5 g water. The dispersion is stirred into 92.5 g of a fruit preparation which consists of apple and pear juice (mixing ratio 1:1) and has been obtained by filtration, dearomatization and concentration to a dry solids content of 75° Brix. The dispersion is subsequently pasteurized and dissolved. The resultant sweetener solution has a pH of 2.8 and a titer of 6.0 m) 1N-KOH/10 g sweetening agent.

EXAMPLE 3 a) 1.5% aspartame and 6% acesulfame K;
b) 0.5% aspartame and 6% acesulfame K; and
c) 1.2% aspartame, 1.3% acesulfame K and 4.8% sodium cyclamate are dispersed in x g water (X=100 g - sweeteners - fruit preparation) and stirred into 85 g of a fruit preparation which consists of apple and lemon juice and has been adjusted by filtration, dearomatization, deacidification and concentration to a dry solids content of 75° Brix.

The dispersion is subsequently pasteurized with the sweeteners being dissolved. The resultant solution has a pH of 3.4 and a titer of 0.9 ml 1N-KOH/10 g sweetening agent.

EXAMPLE 4 a) 0.45% aspartame and 0.45% acesulfame K; and
b) 0.3% aspartame and 0.3% acesulfame K and 0.35% saccharin are dispersed in X g water (x=100 g - sweeteners - fruit preparation) and stirred into 60 g of a fruit preparation which consists of grape and pear juice (mixing ratio 2:1) and has been adjusted by filtration, dearomatization, deacidification and concentration to 75° Brix.

The disperson is subsequently pasteurized with the sweetneners dissolving. The resultant sweetener solution has a pH of 4.2 and a titer of 0.3 ml 1N-KOH/10 g sweetening agent.

EXAMPLE 5

0.8 g aspartame and 0.8 g acesulfame K are mixed in powder form with 0.05% by wt. of ascorbic acid and suspended in 3.3% by wt. of water. 0.05% by wt. of maltol and 95 g of a fruit preparation consisting of pear and pineapple juice (mixing ratio 2:1) are added thereto, the fruit preparation having been obtained by filtration, dearomatization and concentration to a dry solids content of 65° Brix.

The mixture is dispersed and pasteurized. The product obtained has a pH of 4.0 and a titer of 4 ml 1N-KOH/10 g sweetening agent.

What is claimed is:

1. A sweetening agent having an improved sucrose-like flavor, comprising:

a) from 0.3 to 10% by weight of at least one synthetic sweetener selected from the group consisting of aspartame, acesulfame K, sodium cyclamate and saccharin; and b) from 40.0 to 98.0% by weight of at least one dearomatized and concentrated natural fruit preparation from a light-colored fruit having a dry solids content of 60° to 80° Brix;

said agent having an acid concentration, determined as titer, of from 0.01 to 6 ml 1N-KOH/10 g of agent and a pH of 2.8 to 4.5.

2. The sweetening agent of claim 1, which also includes maltol in an amount of from 0.005 to 0.1% by weight.

3. The sweetening agent of claim 1, wherein component a) is a mixture of aspartame and acesulfame K.

4. The sweetening agent of claim 1, wherein said light-colored fruit is apple, pear, grape, lemon, apricot, pineapple or orange or a mixture thereof.

5. The sweetening agent of claim 1, comprising from 1.0 to 6.0% by weight of the synthetic sweetener.

6. The sweetening agent of claim 1, which also includes ascorbic acid.

7. The sweetening agent of claim 1, in dry form.

8. A dry product comprising a mixture of from 20 to 40% by wt. of the sweetening agent of claim 1 and from 60 to 80% by wt. of a carrier material.

9. The dry product of claim 8, in the form of tablets, granules or powder.

10. The dry product of claim 9, in tablet form and further including at least one pressing adjuvant and an expanding agent.

11. The dry product of claim 10, which contains from 10 to 40% by wt. of the mixture of the sweetening agent and the carrier material and from 10 to 40% by wt. of an additional synthetic sweetener.

12. The dry product of claim 9, in granular form and further including at least one additional synthetic sweetener.

13. The dry product of claim 12, which contains from 10 to 30% by wt. of the mixture of the sweetening agent and the carrier material and from 0.1 to 5.0% by wt. of the additional synthetic sweetener.

14. A method for producing the sweetening agent of claim 1, comprising the steps of:

dispersing at least one of the synthetic sweeteners in powder form in at least one dearomatized and concentrated fruit preparation in liquid form to form a dispersion; and pasteurizing the dispersion to dissolve the components of the dispersion and produce a solution.

15. The method of claim 14, which further comprises drying the resultant solution.

16. A dry product comprising:

from 10 to 40% by weight of a mixture of (a), a sweetening agent having an improved sucrose-like flavor, said agent comprising from 0.3 to 10% by weight based on the weight of the agent, of at least one synthetic sweetener selected from the group consisting of aspartame, acesulfame K, sodium cyclamate and saccharin and from 40.0 to 98.0% by weight based on the weight of the agent of at least one dearomatized and concentrated natural fruit preparation from a light-colored fruit having a dry solids content of 60° to 80° Brix, said agent having an acid concentration, determined as titer, of from 0.1 to 6 ml 1N-KOH/10 g of agent and a ph of 2.8 to 4.5 and (b) at least one carrier material; from 10 to 40% by weight of an additional synthetic sweetener; at least one pressing adjuvant; and at least one expanding agent.

* * * * *